US012630400B1

(12) United States Patent
Yang

(10) Patent No.: US 12,630,400 B1
(45) Date of Patent: May 19, 2026

(54) MATERIAL HANDLING EQUIPMENT, HANDLING METHOD APPLIED TO THE MATERIAL HANDLING EQUIPMENT, AND CONTROL ASSEMBLY

(71) Applicant: VisionNav Robotics USA Inc., Acworth, GA (US)

(72) Inventor: Bingchuan Yang, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/175,397

(22) Filed: Apr. 10, 2025

Related U.S. Application Data

(63) Continuation of application No. PCT/IB2025/053685, filed on Apr. 8, 2025.

(30) Foreign Application Priority Data

Jan. 27, 2025 (CN) .......................... 202510127486.3

(51) Int. Cl.
| | |
|---|---|
| *B66F 9/06* | (2006.01) |
| *B66F 9/075* | (2006.01) |
| *G01S 17/86* | (2020.01) |
| *G06V 20/58* | (2022.01) |

(52) U.S. Cl.
CPC ............ *B66F 9/063* (2013.01); *B66F 9/0755* (2013.01); *G01S 17/86* (2020.01); *G06V 20/58* (2022.01)

(58) Field of Classification Search
CPC ........ B66F 9/063; B66F 9/0755; G01S 17/86; G06V 20/58
See application file for complete search history.

(56) References Cited

U.S. PATENT DOCUMENTS

| | | | | |
|---|---|---|---|---|
| 2015/0352721 A1* | 12/2015 | Wicks | .................... | B25J 9/1664 |
| | | | | 700/228 |
| 2021/0223400 A1* | 7/2021 | Park | ...................... | B60W 40/02 |
| 2021/0349468 A1* | 11/2021 | Bukhari | ................ | G05D 1/242 |

FOREIGN PATENT DOCUMENTS

| | | | | |
|---|---|---|---|---|
| CN | 115123839 B | 12/2022 | | |
| CN | 107238828 B | 6/2023 | | |
| CN | 219512404 U | 8/2023 | | |
| WO | WO-2018136889 A1 * | 7/2018 | .............. | E02F 3/964 |

\* cited by examiner

*Primary Examiner* — Ig T An

(74) *Attorney, Agent, or Firm* — Westbridge IP LLC

(57) ABSTRACT

A material handling equipment includes a vehicle body, an attachment assembly, a sensor assembly and a control assembly. The attachment assembly is moveably disposed on the vehicle body, and is configured to pick and place a first stacking object. The sensor assembly is disposed on the vehicle body. During a process in which the material handling equipment handles the first stacking object to make the first stacking object be aligned with a second stacking object, a field of view of the sensor assembly is capable of simultaneously covering a first target region of the first stacking object and a second target region of the second stacking object, to simultaneously acquire a first target data and a second target data. The control assembly controls at least one of the vehicle body and the attachment assembly to move according to the first target data and the second target data.

21 Claims, 13 Drawing Sheets

3021        3011        3022

3021

3011

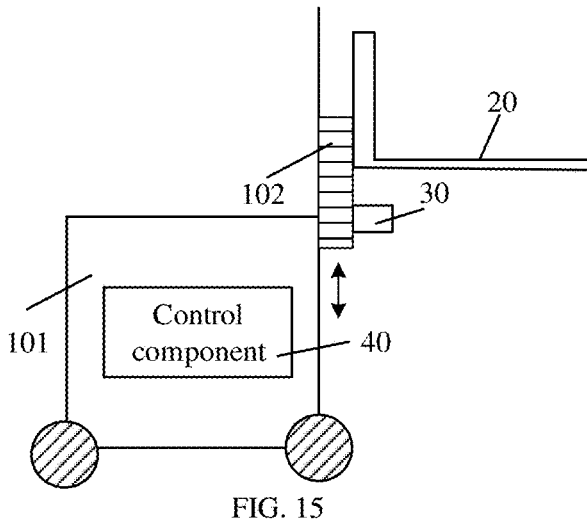

FIG. 15

Instructing, by the control assembly, in a process of controlling the material handling equipment to handle the first stacking object to make the first stacking object be aligned with a second stacking object, the sensor assembly to simultaneously acquire first target data and second target data; the first target data being data acquired by the sensor assembly from a first target area of the first stacking object; and the second target data being data acquired by the sensor assembly from a second target region of the second stacking object; in which a field of view of the sensor assembly is capable of simultaneously covering the first target region of the first stacking object and the second target region of the second stacking object

S1510

Controlling, by the control assembly, according to the first target data and the second target data, at least one of the vehicle body and the attachment assembly to move, to correct a pose error of at least one of the vehicle body and the attachment assembly to make the first stacking object be aligned with the second stacking object

Figure 17:
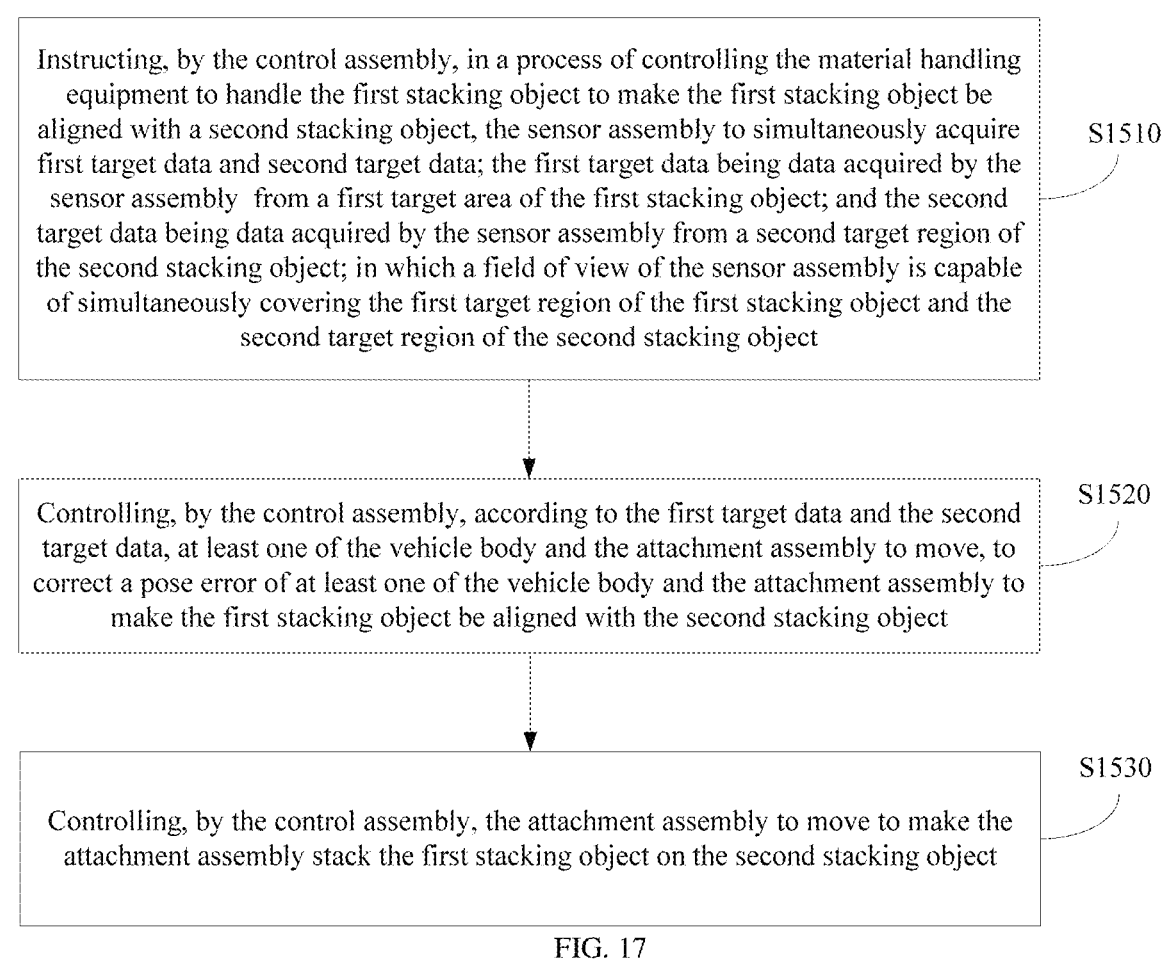

Instructing, by the control assembly, in a process of controlling the material handling equipment to handle the first stacking object to make the first stacking object be aligned with a second stacking object, the sensor assembly to simultaneously acquire first target data and second target data; the first target data being data acquired by the sensor assembly from a first target area of the first stacking object; and the second target data being data acquired by the sensor assembly from a second target region of the second stacking object; in which a field of view of the sensor assembly is capable of simultaneously covering the first target region of the first stacking object and the second target region of the second stacking object

S1510

Controlling, by the control assembly, according to the first target data and the second target data, at least one of the vehicle body and the attachment assembly to move, to correct a pose error of at least one of the vehicle body and the attachment assembly to make the first stacking object be aligned with the second stacking object

S1520

Controlling, by the control assembly, the attachment assembly to move to make the attachment assembly stack the first stacking object on the second stacking object

Figure 18:
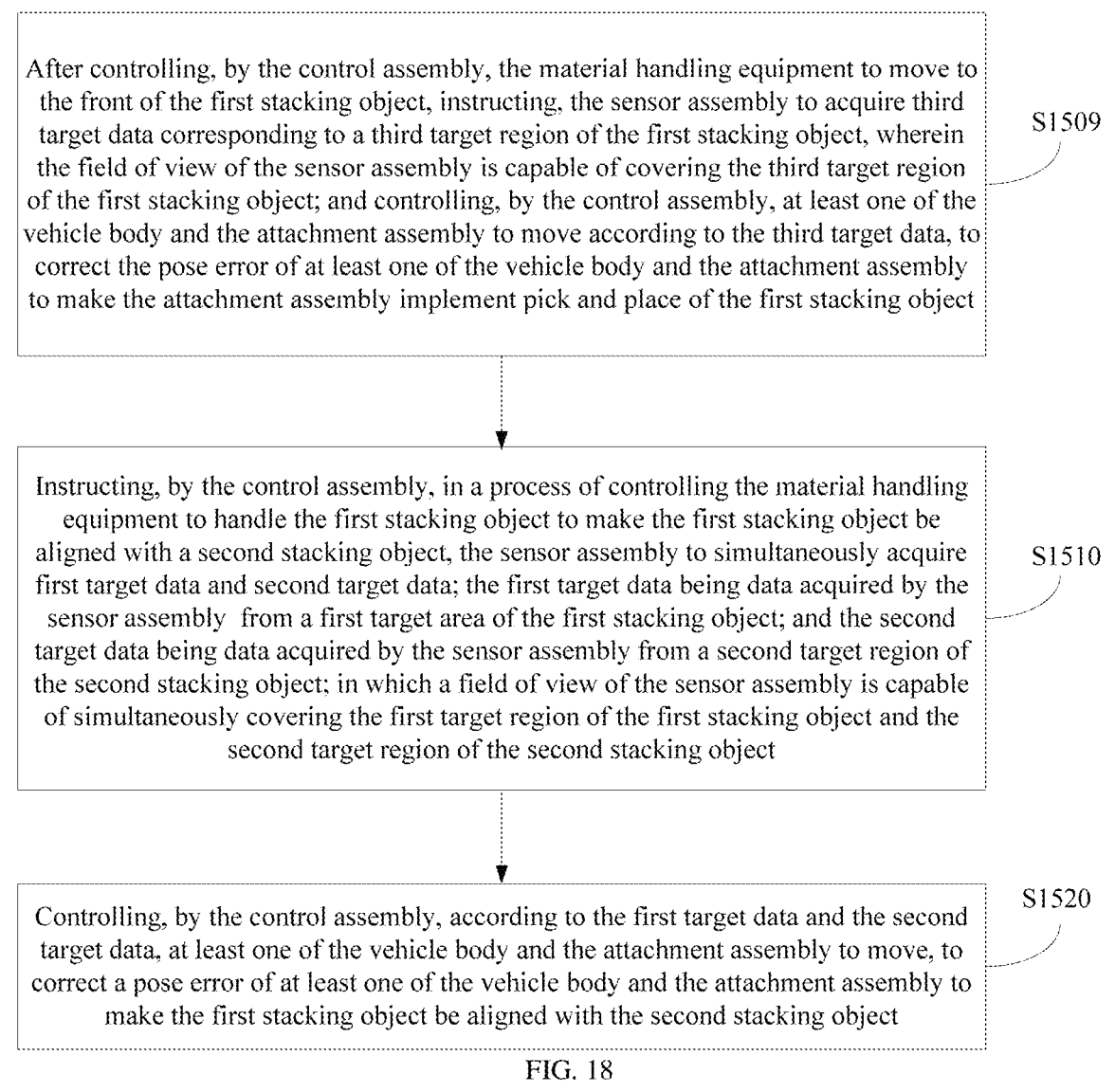

After controlling, by the control assembly, the material handling equipment to move to the front of the first stacking object, instructing, the sensor assembly to acquire third target data corresponding to a third target region of the first stacking object, wherein the field of view of the sensor assembly is capable of covering the third target region of the first stacking object; and controlling, by the control assembly, at least one of the vehicle body and the attachment assembly to move according to the third target data, to correct the pose error of at least one of the vehicle body and the attachment assembly to make the attachment assembly implement pick and place of the first stacking object

S1509

Instructing, by the control assembly, in a process of controlling the material handling equipment to handle the first stacking object to make the first stacking object be aligned with a second stacking object, the sensor assembly to simultaneously acquire first target data and second target data; the first target data being data acquired by the sensor assembly from a first target area of the first stacking object; and the second target data being data acquired by the sensor assembly from a second target region of the second stacking object; in which a field of view of the sensor assembly is capable of simultaneously covering the first target region of the first stacking object and the second target region of the second stacking object

S1510

Controlling, by the control assembly, according to the first target data and the second target data, at least one of the vehicle body and the attachment assembly to move, to correct a pose error of at least one of the vehicle body and the attachment assembly to make the first stacking object be aligned with the second stacking object

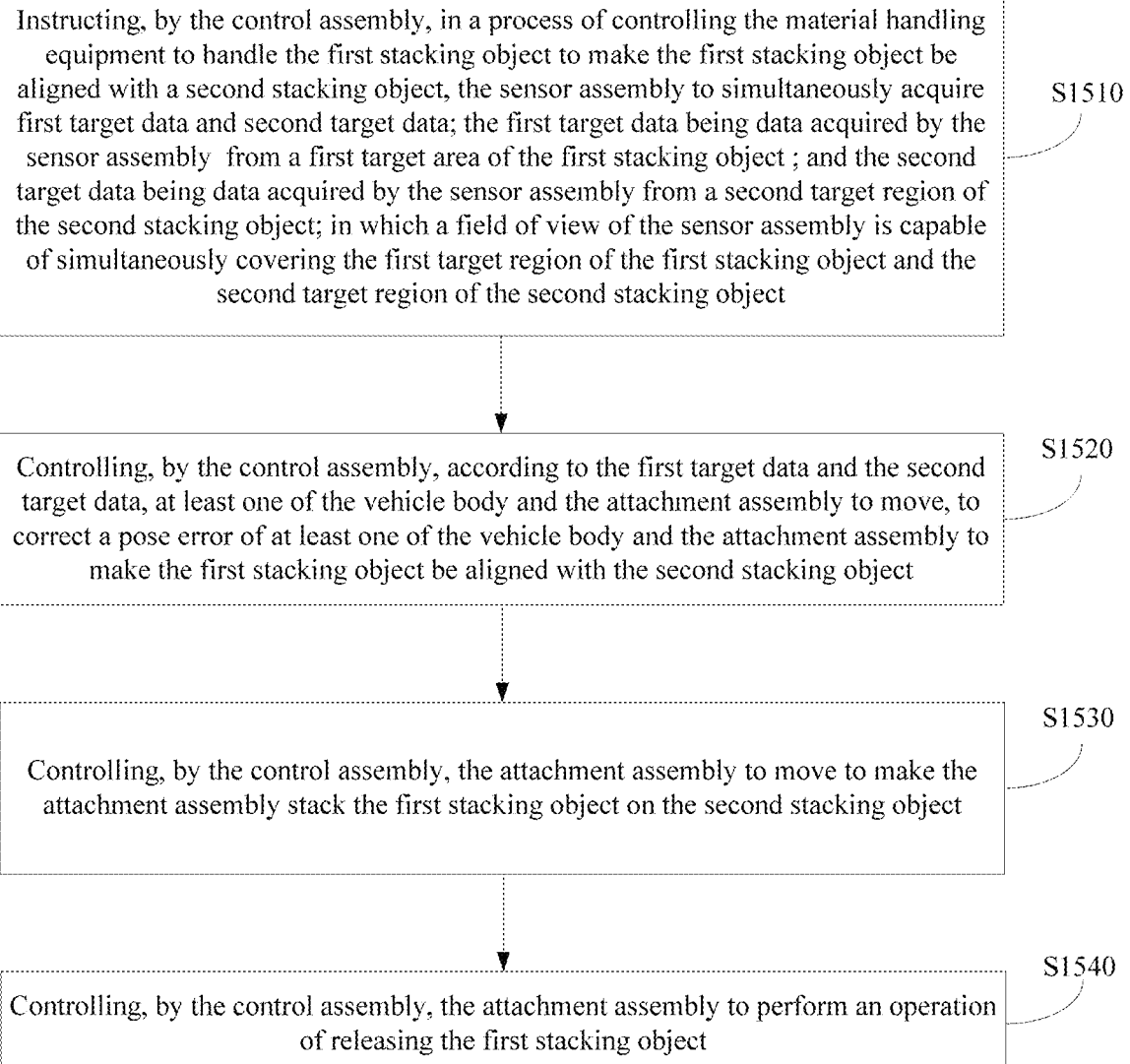

Instructing, by the control assembly, in a process of controlling the material handling equipment to handle the first stacking object to make the first stacking object be aligned with a second stacking object, the sensor assembly to simultaneously acquire first target data and second target data; the first target data being data acquired by the sensor assembly from a first target area of the first stacking object ; and the second target data being data acquired by the sensor assembly from a second target region of the second stacking object; in which a field of view of the sensor assembly is capable of simultaneously covering the first target region of the first stacking object and the second target region of the second stacking object

S1510

Controlling, by the control assembly, according to the first target data and the second target data, at least one of the vehicle body and the attachment assembly to move, to correct a pose error of at least one of the vehicle body and the attachment assembly to make the first stacking object be aligned with the second stacking object

S1520

Controlling, by the control assembly, the attachment assembly to move to make the attachment assembly stack the first stacking object on the second stacking object

S1530

Controlling, by the control assembly, the attachment assembly to perform an operation of releasing the first stacking object

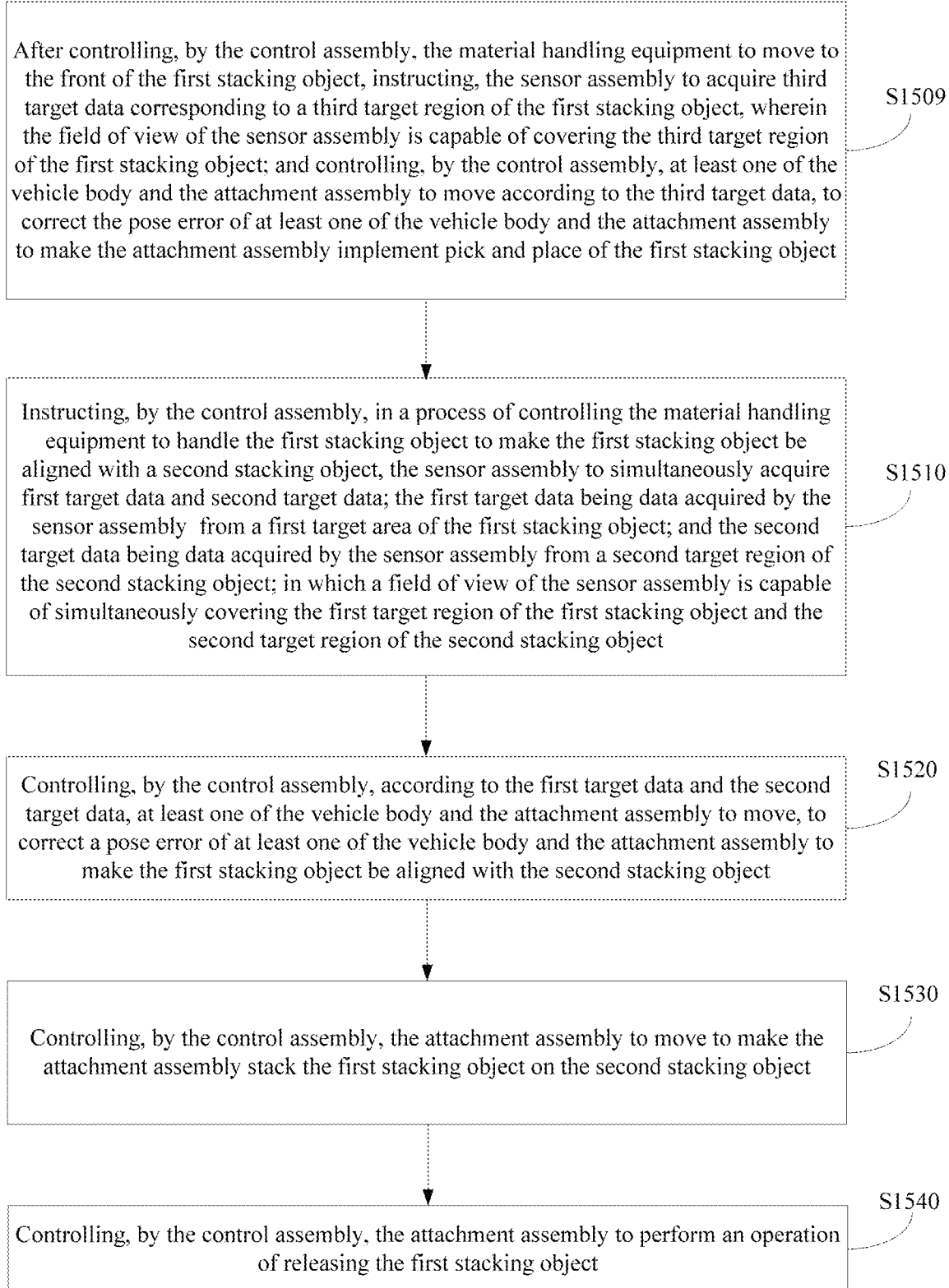

After controlling, by the control assembly, the material handling equipment to move to the front of the first stacking object, instructing, the sensor assembly to acquire third target data corresponding to a third target region of the first stacking object, wherein the field of view of the sensor assembly is capable of covering the third target region of the first stacking object; and controlling, by the control assembly, at least one of the vehicle body and the attachment assembly to move according to the third target data, to correct the pose error of at least one of the vehicle body and the attachment assembly to make the attachment assembly implement pick and place of the first stacking object

S1509

Instructing, by the control assembly, in a process of controlling the material handling equipment to handle the first stacking object to make the first stacking object be aligned with a second stacking object, the sensor assembly to simultaneously acquire first target data and second target data; the first target data being data acquired by the sensor assembly from a first target area of the first stacking object; and the second target data being data acquired by the sensor assembly from a second target region of the second stacking object; in which a field of view of the sensor assembly is capable of simultaneously covering the first target region of the first stacking object and the second target region of the second stacking object

S1510

Controlling, by the control assembly, according to the first target data and the second target data, at least one of the vehicle body and the attachment assembly to move, to correct a pose error of at least one of the vehicle body and the attachment assembly to make the first stacking object be aligned with the second stacking object

S1520

Controlling, by the control assembly, the attachment assembly to move to make the attachment assembly stack the first stacking object on the second stacking object

S1530

Controlling, by the control assembly, the attachment assembly to perform an operation of releasing the first stacking object

MATERIAL HANDLING EQUIPMENT, HANDLING METHOD APPLIED TO THE MATERIAL HANDLING EQUIPMENT, AND CONTROL ASSEMBLY

CROSS-REFERENCE TO RELATED APPLICATIONS

This application is a continuation of International Application No. PCT/IB2025/053685, filed on Apr. 8, 2025, which claims priority to Chinese Patent Application No. 202510127486.3, filed on Jan. 27, 2025. The disclosures of the aforementioned applications are hereby incorporated by reference in their entireties.

TECHNICAL FIELD

The present disclosure relates to the field of warehousing and logistics technologies, and in particular, to material handling equipment, a handling method applied to the material handling equipment, and a control assembly.

BACKGROUND

A system that uses material handling equipment such as an automated guided vehicle (AGV) during operation has advantages such as being highly unmanned, automated, and intelligent, which improves production efficiency and an operational level in industries such as warehousing, manufacturing, and logistics. In a typical scenario, a material handling equipment is often responsible for moving various goods, during which stacking of goods is inevitably involved. Currently, in majority situations, material cages are used for storing the goods instead of traditional wooden boxes, plastic boxes, and the like. Considering space utilization, during a process of handling the material cages, the material handling equipment will involve stacking of the material cages, that is, an action of stacking one material cage above another material cage.

However, in related technologies, it has been found in practice that during a stacking process, a sensor of the material handling equipment has an insufficient field of view in a perpendicular direction. As a result, the material handling equipment cannot accurately implement the stacking, so that an operational efficiency and a precision of the material handling equipment are affected.

SUMMARY

The present disclosure provides material handling equipment and a handling method applied to the material handling equipment, to improve an efficiency and a precision of the material handling equipment in a handling operation.

The present disclosure provides following technical solutions.

According to a first aspect of the present disclosure, material handling equipment is provided, this material handling equipment includes:

a vehicle body;

an attachment assembly movably disposed on the vehicle body, and configured to pick and place a first stacking object;

a sensor assembly disposed on the vehicle body, where during a process in which the material handling equipment transports the first stacking object to make the first stacking object be aligned with a second stacking object, a field of view of the sensor assembly is capable of simultaneously covering a first target region of the first stacking object and a second target region of the second stacking object, to simultaneously obtain first target data corresponding to the first target region and second target data corresponding to the second target region; and a control assembly controlling at least one of the vehicle body and the attachment assembly to move according to the first target data and the second target data, to correct a pose error of at least one of the vehicle body and the attachment assembly to make the first stacking object be aligned with the second stacking object.

Optionally, the sensor assembly includes a lidar assembly, the first target data include first point cloud data, and the second target data include second point cloud data; and a perpendicular field of view of the lidar assembly is capable of simultaneously covering the first target region of the first stacking object and the second target region of the second stacking object, to simultaneously acquire the first point cloud data corresponding to the first target region and the second could point data corresponding to the second target region.

Optionally, the lidar assembly includes at least two lidars, there is a first overlapping region in perpendicular fields of view of the at least two lidars, and the first overlapping region is capable of covering the first target region of the first stacking object and the second target region of the second stacking object simultaneously.

Optionally, the lidar assembly includes a first lidar and a second lidar, and the first lidar and the second lidar are arranged in an upper and lower configuration.

Optionally, the first lidar and the second lidar respectively include a base and a laser emitter disposed on the base, the base and the laser emitter being vertically arranged, a side of the base away from the laser emitter having a first face, and the first face of laser emitter of the first lidar being disposed to face towards or back to the first face of the laser emitter of the second lidar.

Optionally, the sensor assembly includes a camera assembly, the first target data include first image data, and the second target data include second image data; and a horizontal field of view of the camera assembly is capable of covering the first target region of the first stacking object and the second target region of the second stacking object simultaneously, to simultaneously acquire the first image data corresponding to the first target region and the second image data corresponding to the second target region.

Optionally, the camera assembly includes at least two cameras, there is a second overlapping region in horizontal fields of view of the at least two cameras, and the second overlapping region is capable of covering the first target region of the first stacking object and the second target region of the second stacking object simultaneously.

Optionally, the sensor assembly includes a lidar assembly and a camera assembly; and the first target data include first point cloud data and first image data, and the second target data include second point cloud data and second image data;

a perpendicular field of view of the lidar assembly is capable of covering the first target region of the first stacking object and the second target region of the second stacking object simultaneously, to simultaneously acquire the first point cloud data corresponding to the first target region and the second point cloud data corresponding to the second target region; and a horizontal field of view of the camera assembly is capable of covering the first target region of the first stacking object and the second target region of the second stacking object simultaneously, to simultaneously acquire the first image data corresponding to the first target region and the second image data corresponding to the second target region.

Optionally, the lidar assembly includes one lidar, the camera assembly includes one camera, and the lidar and the camera are arranged in a left and right configuration, or are arranged in an upper and lower configuration.

Optionally, the lidar assembly includes at least two lidars, and the at least two lidars are arranged in an oblique or in a vertical direction.

Optionally, the camera assembly includes at least two cameras, and the at least two cameras are arranged in an oblique or in a vertical direction.

Optionally, the lidar assembly includes two lidars, and the camera assembly includes two cameras, the two lidars being arranged along a preset oblique diagonal line, and the two cameras being arranged along a preset oblique diagonal line.

Optionally, the two lidars and the two cameras are respectively arranged along two different intersecting oblique diagonal lines; and the two lidars comprising a first lidar and a second lidar, and the two cameras comprising a first camera and a second camera.

Optionally, a center line of the laser emitter of the first lidar is configured to be inclined downwards by a preset first angle with respect to a horizontal plane; and a center line of the laser emitter of the second lidar is configured to be inclined upwards by a preset second angle with respect to the horizontal plane.

Optionally, the first camera is relatively closer to the vehicle body in a horizontal direction than the laser emitter of the second lidar, to make the horizontal field of view of the second lidar be at least 180 degrees; and the second camera is relatively closer to the vehicle body in the horizontal direction than a laser emitter of the first lidar, to make the horizontal field of view of the second lidar be at least 180 degrees.

Optionally, a center line of the first camera forms a first included angle with the horizontal plane, and a center line of the second camera forms a second included angle with the horizontal plane, to make a combined horizontal field of view of the first camera and the second camera be at least 180 degrees.

Optionally, the sensor assembly also includes a first installation platform and a second installation platform disposed adjacent to each other, and the first installation platform is located below the second installation platform, in which:

the first lidar is disposed on an upper surface of the first installation platform; where the first camera is disposed on a lower surface of the first installation platform;

the second lidar is disposed on a lower surface of the second installation platform; and the second camera is disposed on an upper surface of the second installation platform.

Optionally, the vehicle body includes a main body and a movable part, the movable part being moveably disposed on the main body, the attachment assembly being disposed on the movable part, and the moving part being configured to drive the attachment assembly to move relative to the main body; and the sensor assembly being disposed on the movable part, and being located below the attachment assembly in the vertical direction.

According to a second aspect of the present disclosure, a handling method applied to material handling equipment is provided, where the material handling equipment includes a vehicle body, an attachment assembly, a sensor assembly and a control assembly, the attachment assembly being moveably disposed on the vehicle body, and the attachment assembly being configured to pick and place a first stacking object; and the sensor assembly being disposed on the vehicle body, and the method handling includes:

instructing, by the control assembly, in a process of controlling the material handling equipment to handle a first stacking object to make the first stacking object be aligned with a second stacking object, the sensor assembly to simultaneously acquire first target data and second target data; the first target data being data acquired by the sensor assembly from a first target area of the first stacking object; and the second target data being data acquired by the sensor assembly from a second target region of the second stacking object; in which a field of view of the sensor assembly is capable of simultaneously covering the first target region of the first stacking object and the second target region of the second stacking object; and controlling, according to the first target data and the second target data, at least one of the vehicle body and the attachment assembly to move, to correct a pose error of at least one of the vehicle body and the attachment assembly to make the first stacking object be aligned with the second stacking object.

Optionally, after aligning the first stacking object with the second stacking object, the handling method further includes:

controlling, by the control assembly, the attachment assembly to move to make the attachment assembly stack the first stacking object on the second stacking object.

Optionally, before the controlling the material handling equipment to handle the first stacking object, the method further includes:

after controlling, by the control assembly, the material handling equipment to move to the front of the first stacking object, instructing, the sensor assembly to acquire third target data corresponding to a third target region of the first stacking object; in which the field of view of the sensor assembly is capable of covering the third target region of the first stacking object; and controlling, by the control assembly, at least one of the vehicle body and the attachment assembly to move according to the third target data, to correct a pose error of at least one of the vehicle body and the attachment assembly to make the attachment assembly implement pick and place of the first stacking object.

Optionally, after the controlling, by the control assembly, the attachment assembly to move to make the attachment assembly stack the first stacking object on the second stacking object, the handling method further includes:

controlling, by the control assembly, the attachment assembly to perform an operation of releasing the first stacking object.

Optionally, the sensor assembly includes at least one of a lidar assembly and a camera assembly;

the first target data include at least one of first point cloud data collected by the lidar assembly and first image data collected by the camera assembly; and the second target data include at least one of second point cloud data collected by the lidar assembly and second image data collected by the camera assembly.

According to a third aspect of the present disclosure, a control assembly is provided, this control assembly includes a controller configured to execute the handling method above-mentioned.

According to embodiments provided in the present disclosure, technical solutions of the present disclosure have the following technical effects.

In the embodiments of the present disclosure, a field of view of the sensor assembly mounted on the material handling equipment is expanded, such that in a process in which the material handling equipment handles the first stacking object to make the first stacking object be align with the second stacking object, the sensor assembly is capable of acquiring first target data corresponding to a first target region and second target data corresponding to a second target region simultaneously. Compared with the conventional technology, the detection capability of the first stacking object and the second stacking object is enhanced, and thereby significantly improving an efficiency and a precision of handling operation.

Furthermore, during a stacking process, the material handling equipment may realize synchronous monitoring and real-time regulation of the first stacking object and the second stacking object through the mounted sensor assembly. By continuously correcting the pose error of at least one of the vehicle body and the attachment assembly, an alignment error of the first stacking object relative to the second stacking object during the stacking process is continuously corrected. In this way, the possible accumulation of the error in the stacking process may be effectively reduced, so that a success rate of a stacking operation is significantly improved, and thus a success rate of a stacking operation is significantly improved. In addition, a tolerance requirement of a stacking object is reduced, so that the stacking process more efficient and secure.

BRIEF DESCRIPTION OF THE DRAWINGS

To describe technical solutions in embodiments of the present disclosure or the conventional technology more clearly, the accompanying drawings required for the embodiments will be briefly described in the following. Obviously, the accompanying drawings in the following description show merely some embodiments of the present disclosure. For a person of ordinary skill in this art, other drawings may still be derived from these accompanying drawings without creative labor.

FIG. 15 is a schematic structural diagram of material handling equipment according to the embodiment of the present disclosure.

FIG. 16 is a flowchart of a handling method applied to a material handling equipment according to an embodiment of the present disclosure.

FIG. 17 is another flowchart of a handling method applied to material handling equipment according to an embodiment of the present disclosure.

FIG. 18 is a flowchart of a handling method applied to material handling equipment according to an embodiment of the present disclosure.

FIG. 19 is yet another flowchart of a handling method applied to material handling equipment according to an embodiment of the present disclosure.

FIG. 20 is yet another flowchart of a handling method applied to material handling equipment according to an embodiment of the present disclosure.

DETAILED DESCRIPTION OF THE EMBODIMENTS

Figure 1:
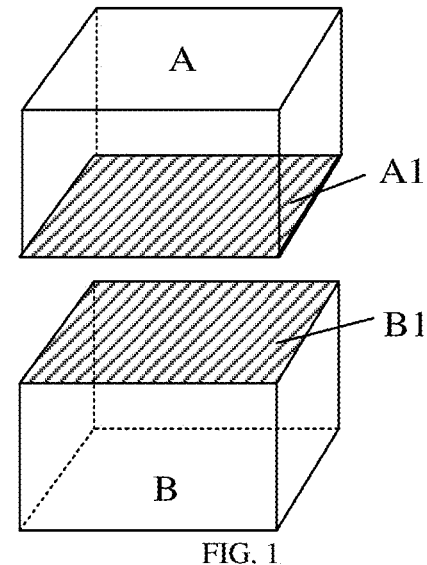
FIG. 1 is a schematic diagram of a first target region and a second target region according to an embodiment of the present disclosure.

Terms used in embodiments of the present disclosure are merely for the purpose of describing specific embodiments, and are not intended to limit the present disclosure. The singular forms "a", "said/the" and "this" used in the embodiments of the present disclosure and the appended claims are also intended to include multiple forms, unless the context clearly indicates other meanings.

It should be understood that, the term "and/or" used in the specification is merely an associated relationship describing the associated objects. It indicates that there may be three kinds of the relationships, for example, the expression "A and/or B" may indicate that: there is the A only, there are the A and B at the same time, and there is the B only. In addition, the character "/" in the specification generally indicates that the associated objects are in a "or" relationship. Moreover, in the specification, at least one of A and B is merely an associated relationship that describes the associated objects, which indicates that there may be three kinds of the relationships. For example, the expression "at least one of A and B" may indicate that: there is the A only, there are the A and B at the same time, and there is the B only.

According to the present, material handling equipment, a handling method applied to the material handling equipment and a control assembly is provided based on a new concept.

Firstly, terms appearing in the embodiments of the present disclosure are explained below.

The term "stacking" refers to that several objects are arranged and stacked in an upper and lower manner according to certain rules.

The term "stacking object" refers to an object involved in stacking, specifically, it may be the goods themself, goods with simple packaging such as goods wrapping with film, or a container, for example, a material cage, a wooden box, a plastic box or a pallet, which accommodates and carries goods.

The term "stacking process" refers to a process in which a material handling equipment lifts a first stacking object to make the first stacking object moves closer to a second stacking object, and then the first stacking object is aligned with the second stacking object by adjusting a pose of the material handling equipment, so as to place the first stacking object on the second stacking object to complete the stacking.

Among them, the term "first stacking object" refers to a stacking object located above, and the term "second stacking object" refers to a stacking object located below.

The term "stacking state" refers to a relative position state of two stacking objects in a stacking process.

The term "align/alignment" refers to a state in which two or more stacking objects are arranged in a perpendicular direction while at least a portion of border lines between the stacking objects are parallel or coincide with each other. Among them, the perpendicular direction refers to a Z-axis direction under a coordinate system of material handling equipment (that is, a height direction of the material handling equipment).

A first stacking object has a first target region and a third target region, which refers to specific regions on the first stacking object that are used for detection and analysis, for example, key structural regions such as a boundary or an edge target point of the first stacking object.

A second stacking object has a second target region, which refers to a specific region on the second stacking object that is used for detection and analysis, for example, a key structural region such as a boundary or an edge target point of the second stacking object.

It should be also noted that, in the embodiments of the present disclosure, the second stacking object may be not only goods or a container accommodating goods, but also a stationary base that serves as a foundation for stacking.

Processor: it is responsible for executing core functions such as calculation, control and decision-making. It may receive data from a sensor, run control algorithms, and command an actuator to complete a task. Common processor types may include: a central processing unit (CPU), a digital signal processor (DSP), a microcontroller unit (MCU), and so on. The processor in the specification may refer to a collection of processors for performing the same or different tasks.

Memory: it is configured to store data or a program. A memory in the specification may be referred to as a collection of memories for performing the same or different tasks.

Controller: at the hardware level, the controller generally includes a processor and a memory. Optionally, the controller may also include input and output interfaces, a mainboard, peripheral circuits and elements. At the software level, the controller generally includes a control algorithm, an operating system, a communication protocol, and so on. A controller in the specification may be referred to as a collection of controllers for performing the same or different tasks.

Control assembly: it is an integrated set of a software and a hardware configured to ensure that a robot is controlled according to a predetermined goal or strategy when performing a task, which may include a controller, a sensor and an actuator. Optionally, the control assembly may also include peripheral circuits, wiring harnesses, and the like.

Material handling equipment: it refers to a device that may automatically or semi-automatically perform a handling task. Common forms of the material handling equipment include a forklift, an automated guided vehicle (AGV), an autonomous mobile robot (AMR), a humanoid robot, a robotic arm, and the like.

Technical solutions in the embodiments of the present disclosure will be clearly and completely described with reference to the accompanying drawings in the embodiment of the present disclosure below. Apparently, the described embodiments are merely some rather than all of the embodiments of the present disclosure. Based on the embodiments of the present disclosure, all other embodiments obtained by a person skilled in the art will fall within the protection scope of the present disclosure.

FIG. 1 is a schematic diagram of a first target region and a second target region according to an embodiment of the present disclosure. In FIG. 1, a stacking object A located above is a first stacking object, a stacking object B located below is a second stacking object, a bottom structural region of the first stacking object is a first target region A1, and a top structural area of the second stacking object is a second target region B1.

Figure 2:
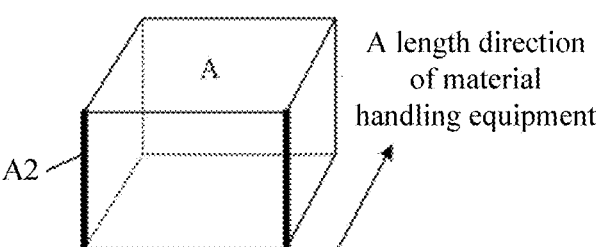
FIG. 2 is a schematic diagram of a third target region according to an embodiment of the present disclosure.

FIG. 2 is a schematic diagram of a third target region according to an embodiment of the present disclosure, in which a stacking object A is a first stacking object. When the material handling equipment is controlled to move to the front of the first stacking object, structural regions (such as an upright and a jack, and the like) on both sides of the stacking object A is the third target region when viewed along a length direction of the material handling equipment (that is, a driving direction of the material handling equipment).

The term "target data" refers to data acquired by a sensor, including a point cloud data and an image data.

The term "first target data" refers to data of the first target region of the first stacking object acquired by the sensor, including point cloud data and image data. The first target data may be used for calculating a pose, a stacking state, and the like of the first stacking object.

The term "second target data" refers to data of the second target region of the second stacking object acquired by the sensor, including point cloud data and image data. The second target data may be used for calculating a pose, a stacking state, and the like of the second stacking object.

Figure 3:
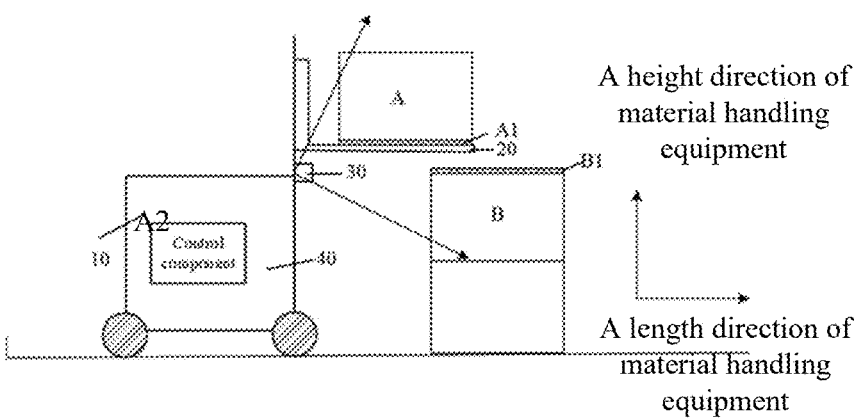
FIG. 3 is a working state diagram that shows material handling equipment performing stacking between a first stacking object and a second stacking object.

FIG. 3 is a schematic structural diagram of material handling equipment according to an embodiment of the present disclosure. This material handling equipment includes a vehicle body 10, an attachment assembly 20, a sensor assembly 30, and a control assembly 40. Each constituent part is introduced below.

The attachment assembly 20 is movably disposed on the vehicle body 10, and is configured to pick and place the first stacking object A. Among them, the attachment assembly 20 specifically refers to an auxiliary apparatus mounted on the vehicle body 10, and is configured to extend functions of the material handling equipment, such that the attachment assembly 20 is capable of handling diversified materials. Specifically, the attachment assembly 20 may include any one of a fork assembly, a clamp assembly, a robotic arm assembly, or the like. When the attachment assembly 20 includes the fork assembly, the fork assembly is configured to fork the first stacking object A. When the attachment assembly 20 includes the clamp assembly, the clamp assembly is configured to clamp the first stacking object A. When the attachment assembly 20 includes the robotic arm assembly, the robotic arm assembly is configured to grab the first stacking object A. For example, the fork assembly may include a fork, the clamp assembly may include a clamp, and the robotic arm assembly may include a robotic arm.

The sensor assembly 30 is disposed on the vehicle body 10. During a process that the material handling equipment 1 handles the first stacking object A to make the first stacking object A be aligned with the second stacking object B, a field of view of the sensor assembly 30 is capable of simultaneously covering a first target region A1 of the first stacking object A and a second target region B1 of the second stacking object B, to simultaneously acquire first target data corresponding to the first target region A1 and second target data corresponding to the second target region B1.

The control assembly 40 controls at least one of the vehicle body 10 and the attachment assembly 20 to move according to the first target data and the second target data, to correct a pose error of at least one of the vehicle body 10 and the attachment assembly 20 to make the first stacking object A be aligned with the second stacking object B. For example, the control assembly 40 may include a controller. For example, the controller may include a processor and a memory, where the memory is configured to store a program instruction, and the processor is configured to execute the program instruction, to implement a method of the embodiment of the present disclosure.

In the embodiment of the present disclosure, by expanding a field of view of the sensor assembly 30 mounted on the material handling equipment, during a process that the material handling equipment handles the first stacking object A to make the first target region A1 be aligned with the second target region, the sensor assembly 30 is capable of acquiring the first target data corresponding to the first target region A1 and the second target data corresponding to the second target region B1 simultaneously. Compared with conventional technology, a detection capability for the first stacking object A and for the second stacking object B is enhanced, so that an efficiency and a precision of a handling operation is significantly improved.

Furthermore, in the stacking process, the material handling equipment may realize synchronous monitoring and real-time regulation for the first stacking object A and the second stacking object B through the mounted sensor assembly 30. By continuously correcting the pose error of at least one of the vehicle body 10 and the attachment assembly 20, an alignment error of the first stacking object A relative to the second stacking object B in the stacking process is continuously corrected. In this way, the possible accumulation of the error in the stacking process may be effectively reduced, and a success rate of a stacking operation is significantly improved. In addition, a tolerance requirement of a stacking object is reduced, so that the stacking process is more efficient and secure.

In addition, in a servo closed-loop alignment process, the control assembly 40 controls the material handling equipment to continuously correct the pose error of at least one of the vehicle body 10 and the attachment assembly 20 according to information fed back by the sensor assembly 30, until the pose error is corrected to a set threshold range. After the pose error is corrected to the set threshold range, the control assembly 40 will performs a final determination and confirmation, to ensure that an alignment error between the first stacking object A and the second stacking object B meets a requirement of a scenario. In this case, the attachment assembly 20 may be safely lowered, and the stacking operation is completed.

Furthermore, in a pose error correction process of at least one of the vehicle body 10 and the attachment assembly 20, if this pose error cannot be corrected within the set threshold range, the control assembly 40 will continuously control the material handling equipment to continuously correct the pose error of at least one of the vehicle body 10 and the attachment assembly 20, until the pose error is corrected within the specified threshold range. If the control assembly 40 still finds that the alignment error between the first stacking object A and the second stacking object B is greater than the tolerance requirement of the scenario when performing the final determination and confirmation, the control assembly 40 will start a "big error retry mechanism" to make the material handling equipment enter a retry process, to ensure that the success of the stacking. This retry mechanism is aimed at dealing with the situation with a large deviation, and a success rate of the stacking is improved through multiple regulation s and corrections.

The closed-loop alignment technology used in the present disclosure realizes synchronous observation and control correction of the first stacking object A and the second stacking object B through a solution in which a special sensor assembly 30 is provided. In the entire stacking process, the sensor assembly 30 keeps being activated all the time to monitor the alignment state between the first stacking object A and the second stacking object B in real time, and form closed-loop feedback between perception and control. In this way, accumulation of various errors in the stacking process may be effectively reduced, such as a pose deviation caused by uneven ground, deformation of a door frame, perception and controlling errors when picking goods, an odometer error, and a problem that the first stacking object A slides on the attachment assembly 20 in the stacking process. Through the closed-loop control of the entire stacking process, not only the success rate of the stacking is improved, but also the tolerance requirement for the stacking object is reduced, and thus making the entire stacking process more efficient and secure.

Figure 4:
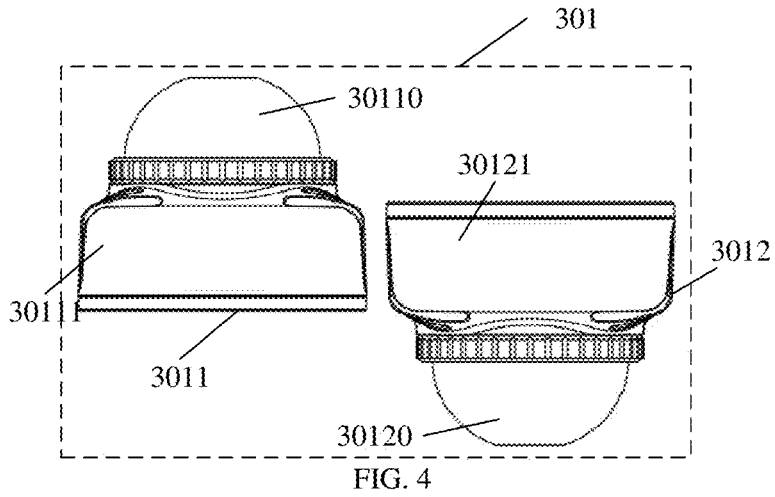
FIG. 4 is a schematic structural diagram of a lidar assembly according to an embodiment of the present disclosure.

Referring to FIG. 3 and FIG. 4, as an implementable manner, the sensor assembly 30 may include a lidar assembly 301, the first target data include first point cloud data, and the second target data include second point cloud data. In this case, a perpendicular field of view of the lidar assembly 301 is capable of covering the first target region A1 of the first stacking object A and the second target region B1 of the second stacking object B simultaneously, to simultaneously acquire the first point cloud data corresponding to first target region A1 and the second point cloud data corresponding to the second target region B1.

Figure 12:
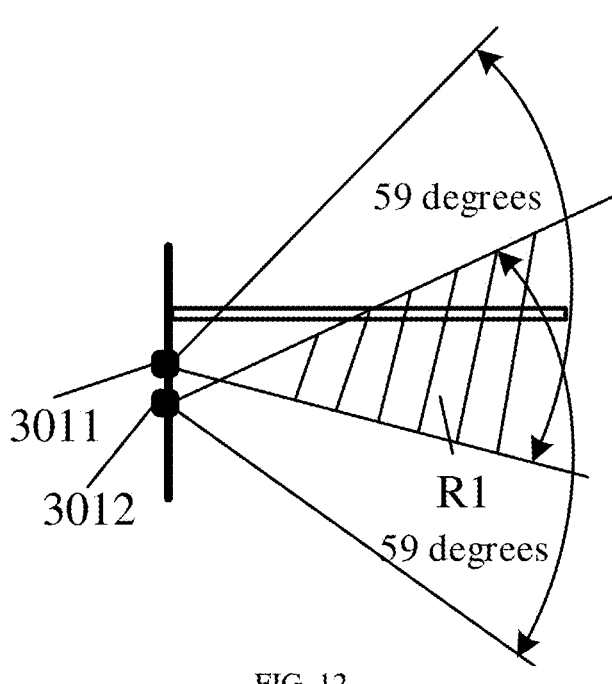
FIG. 12 is a schematic diagram of perpendicular fields of view of a first lidar and a second lidar according to an embodiment of the present disclosure.

Referring to FIG. 12, optionally, the lidar assembly 301 in an embodiment of the present disclosure includes at least two lidars. There is a first overlapping region R1 in vertical fields of view of the at least two lidars, and the first overlapping region R1 is capable of covering the first target region A1 of the first stacking object A and the second target region B1 of the second stacking object B simultaneously.

In the embodiment of the present disclosure, by integrating at least two lidars in the lidar assembly 301 and setting a first overlapping region R1, such that overlay and coverage between the point cloud data of the first target region A1 of the first stacking object A and the point cloud data of the second target region B1 of the second stacking object B is realized. Therefore, not only an accuracy of the material handling equipment in identifying and positioning the boundaries of the two stacking objects is greatly improved, but also a high accuracy and reliability of detection are ensured. Moreover, since a density of the point cloud data within the first overlapping region R1 is enhanced, so that the lidar is capable of shortening an integration time while maintaining a high detection accuracy, and thus a detection efficiency of the lidar is significantly improved. In addition, a layout with multi-lidars ensures that the sensor assembly 30 is capable of continuously and stably detecting the target data in the stacking process, and thus detection failure caused by environment changes is effectively avoided.

Figure 5A:
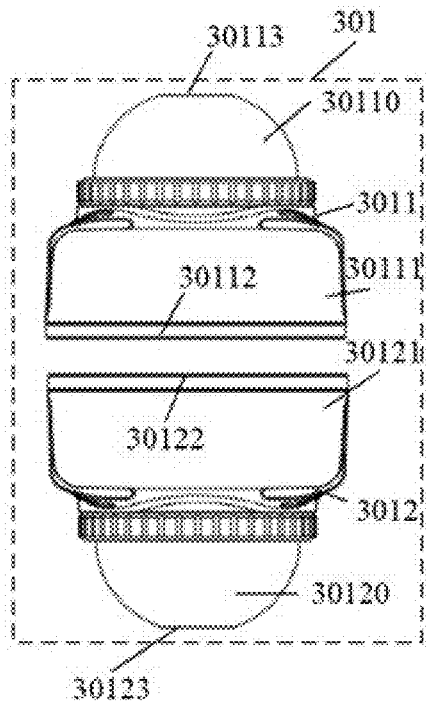
FIG. 5a is a schematic structural diagram of a lidar assembly according to an embodiment of the present disclosure.
Figure 5B:
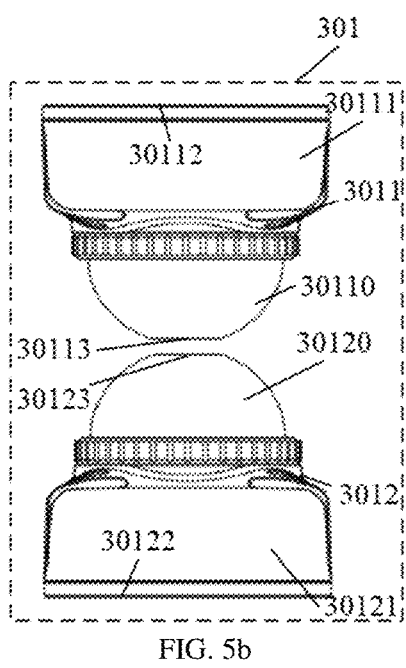
FIG. 5b is another schematic structural diagram of a lidar assembly according to an embodiment of the present disclosure.

As shown in FIG. 4, FIG. 5a and FIG. 5b, optionally, the lidar assembly 301 includes a first lidar 3011 and a second lidar 3012. The first lidar 3011 and the second lidar 3012 may be arranged in an upper and lower configuration, or be arranged in a left and right configuration. It should be noted that, the left and right configuration might be in a form of positive alignment, or may be in a form of oblique alignment. Similarly, the upper and lower configuration may be in a form of positive alignment, or might be in a form of oblique alignment. Specifically, FIG. 4 shows a schematic structural diagram of the first lidar 3011 and the second lidar 3012 which are arranged in the left and right configuration, and FIG. 5a and FIG. 5b shows a schematic structural diagram of the first lidar 3011 and the second lidar 3012 which are arranged in the upper and lower configuration.

Referring to FIG. 5a and FIG. 5b, specifically, the first lidar 3011 includes a base 30111 and a laser emitter 30110 disposed on the base 30111. The base 30111 and the laser emitter 30110 are vertically arranged. This laser emitter 30110 may be, but is not limited to, a ball-head laser emitter. A side of the base 30111 away from the laser emitter 30110 has a first face 30112, and a side of the laser emitter 30110 away from the base 30111 has a second face 30113. The second lidar 3012 includes a base 30121 and a laser emitter 30120 disposed on the base 30121. The base 30121 and the laser emitter 30120 are vertically arranged. This laser emitter 30120 may be, but is not limited to, a ball-head laser emitter. A side of the base 30121 away from the laser emitter 30120 has a first face 30122, and a side of the laser emitter 30120 away from the base 30121 has a second face 30123. Optionally, as shown in FIG. 5a, the first face 30112 of the first lidar 3011 is disposed to face towards the first face 30122 of the second lidar 3012, and the second face 30113 of the first lidar 3011 is disposed to back to the second face 30123 of the second lidar 3012.

Optionally, as shown in FIG. 5b, the first face 30112 of the first lidar 3011 is disposed to back to the first face 30122 of the second lidar 3012, and the second face 30113 of the first lidar 3011 is disposed to face towards to the second face 30123 of the second lidar 3012.

It should be noted that, in the embodiment of the present disclosure, the layout of the at least two lidars in the lidar assembly 301 is not limited to a specific configuration manner. It is feasible to set a flexible layout according to different application scenarios and requirements. The layout of the lidars is aimed at optimizing the coverage of the perpendicular field of view and a collection efficiency of the point cloud data, to ensure that the first overlapping region is capable of fully covering the first target region A1 of the first stacking object A and the second target region B1 of the second stacking object B, and regardless of whether it is arranged in the left and right and lower configuration, or is arranged in the upper and lower configuration.

Figure 6A:
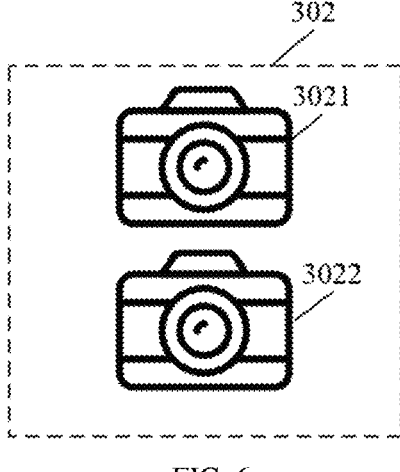
FIG. 6a is a schematic structural diagram of a camera assembly according to an embodiment of the present disclosure.
Figure 6B:
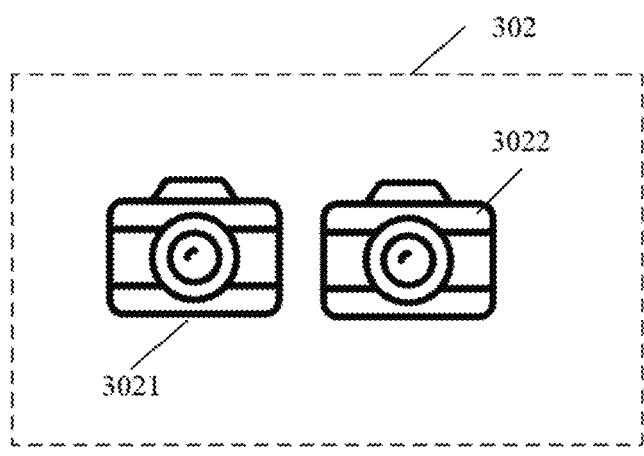
FIG. 6b is another schematic structural diagram of a camera assembly according to an embodiment of the present disclosure.

Referring to FIG. 3, FIG. 6a and FIG. 6b, as another implementable manner, the sensor assembly 30 includes a camera assembly 302, the first target data include first image data, and the second target data include second image data. Based on this, a horizontal field of view of the camera assembly 302 is capable of covering the first target region A1 of the first stacking object A and the second target region B1 of the second stacking object B simultaneously, to simultaneously acquire the first image data corresponding to the first target region A1 and the second image data corresponding to the second target region B1.

Figure 14:
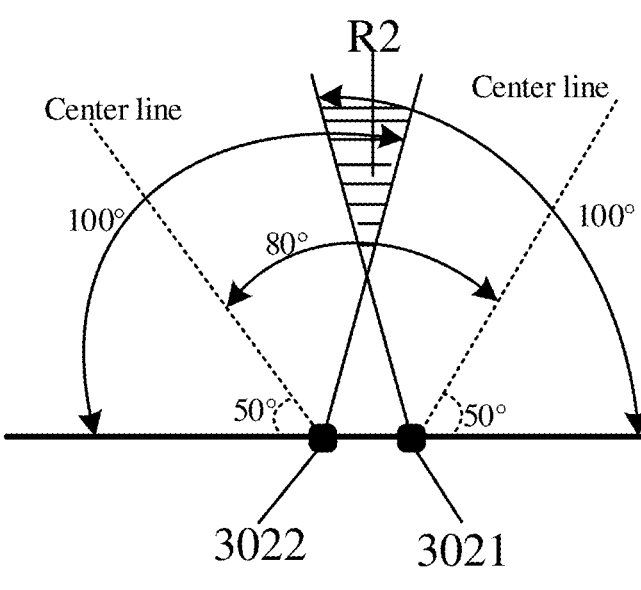
FIG. 14 is a schematic diagram of horizontal fields of view of a first camera and a second camera according to an embodiment of the present disclosure.

Referring to FIG. 14, optionally, the camera assembly 302 in an embodiment of the present disclosure includes at least two cameras. There is a second overlapping region R2 in horizontal fields of view of the at least two cameras, and the second overlapping region R2 is capable of covering the first target region A1 of the first stacking object A and the second target region B1 of the second stacking object B simultaneously.

In the embodiment of the present disclosure, by integrating at least two in the camera assembly 302 and setting a second overlapping region, a dual visual coverage of the first target region A1 of the first stacking object A and the second target region B1 of the second stacking object B is realized, so that an accuracy and robustness of visual detection is improved, thereby improving an accuracy on image identifying and stability on target tracking and optimizing fusion of visual data, and thus the efficiency and the precision of the handling operation is significantly improved.

As shown in FIG. 6a and FIG. 6b, taking two cameras integrated in the camera module 302 as an example, configuration manners thereof are shown. Among them, FIG. 6a shows a schematic structural in which the first camera 3021 and the second camera 3022 are arranged in an upper and lower configuration, and FIG. 6b shows a schematic structural diagram in which the first camera 3021 and the second camera 3022 are arranged in a left and right configuration.

It should be noted that, in the embodiment of the present disclosure, the layout of the at least two cameras in the camera assembly 302 is not limited to a specific configuration manner. It is feasible to set a flexible layout according to different application scenarios and requirements, for example, they are arranged in an upper and lower configuration, or a left and right configuration. The layout of the cameras is aimed at optimizing coverage of the horizontal field of view and a collection efficiency of the image data, to ensure that the second overlapping region is capable of fully covering the first target region of the first stacking object and the second target region of the second stacking object, and regardless of the configuration manner.

As another implementable manner, a sensor assembly 30 may include a lidar assembly 301 and a camera assembly 302, the first target data include first point cloud data and first image data, and the second target data include second point cloud data and second image data.

A perpendicular field of view of the lidar assembly 301 is capable of covering the first target region A1 of the first stacking object A and the second target region B1 of the second stacking object B simultaneously, to simultaneously acquire the first point could data corresponding to the first target region A1 and the second point cloud data corresponding to the second target region B1.

A horizontal field of view of the camera assembly 302 is capable of covering the first target region A1 of the first stacking object A and the second target region B1 of the second stacking object B simultaneously, to simultaneously acquire the first image data corresponding to the first target region A1 and the second image data corresponding to the second target region B1.

In the embodiment of the present disclosure, by combining the lidar assembly 301 and the camera assembly 302 to the sensor assembly 30, a fusion detection for the point cloud data and the image data is realized. On the one hand, a resolution ratio and a precision of the detection are improved. Through a complementarity of multiple sensors, a perception capability of the material handling equipment on environment is enhanced, so that an accuracy on target detection and recognition is effectively improved. On the other hand, it makes the material handling equipment be capable of acquiring an accurate perception data in real time before and after the stacking, so that the accuracy and the stability of the stacking is ensured.

Optionally, the lidar assembly 301 includes one lidar, and the camera assembly 302 includes one camera. This lidar and the camera may be arranged in an upper and lower configuration, or arranged in a left and right configuration. As described above, the left and right configuration may be in a form of positive alignment, or may be in a form of oblique alignment. Similarly, the upper and lower configuration may be in a form of positive alignment, or in a form of oblique alignment.

Optionally, when the sensor assembly 30 includes the lidar assembly 301 and the camera assembly 302, and the lidar assembly includes at least two lidars. The at least two lidars are arranged in an oblique or in a vertical direction.

Optionally, when the sensor assembly 30 includes the lidar assembly 301 and the camera assembly 302, and the camera assembly 302 includes at least two cameras. The at least two cameras are arranged in an oblique or in a vertical direction.

Optionally, when the sensor assembly 30 includes the lidar assembly 301 and the camera assembly 302, the lidar assembly 301 includes two lidars, and the camera assembly 302 includes two cameras. The two lidars are arranged along a preset oblique diagonal line, and the two cameras are arranged along a preset oblique diagonal line. Specifically, the two lidars and the two cameras may be respectively distributed along two different intersecting oblique diagonal lines, such that a mechanical installation space of the sensor assembly 30 is more compact.

As shown in FIG. 7 to FIG. 10, they are schematic structural diagrams of the sensor assembly 30 according to embodiments of the present disclosure, which are used for describing different configuration manners.

Figure 7:
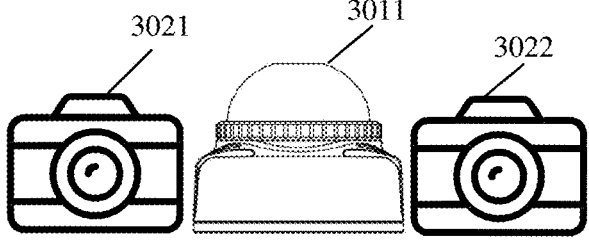
FIG. 7 is a schematic structural diagram of a sensor assembly according to an embodiment of the present disclosure.

FIG. 7 shows a sensor assembly 30 including a first lidar 3011, a first camera 3021, and a second camera 3022, in which the first camera 3021 and the second camera 3022 are located on left and right sides of the first Lidar 3011, respectively.

Figure 8:
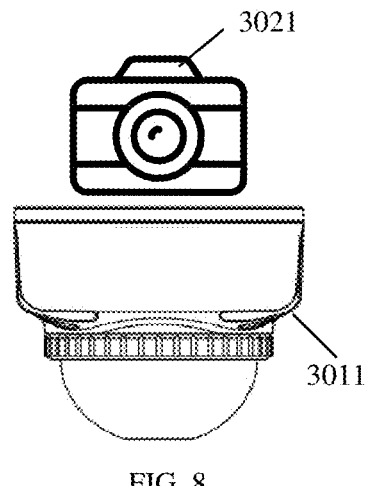
FIG. 8 is a schematic structural diagram of a sensor assembly according to an embodiment of the present disclosure.

FIG. 8 shows a sensor assembly 30 including a first lidar 3011 and a first camera 3021, in which the first camera 3021 is located above the first lidar 3011.

Figure 9:
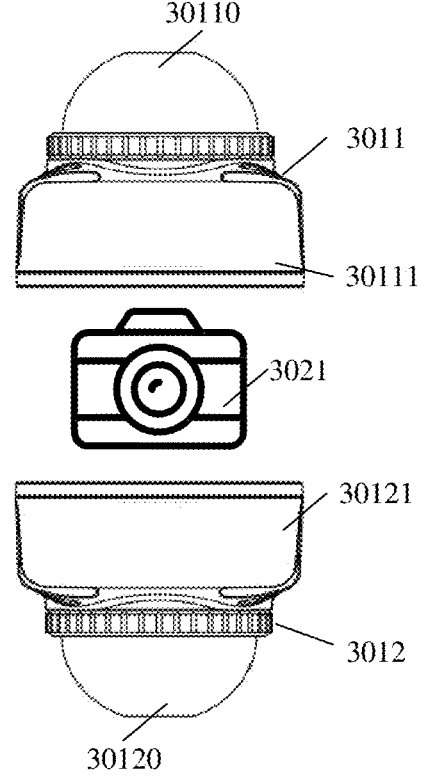
FIG. 9 is a schematic structural diagram of a sensor assembly according to an embodiment of the present disclosure.

FIG. 9 shows a sensor assembly 30 including a first lidar 3011, a second lidar 3012, and a first camera 3021, in which the first lidar 3011 and the second lidar 3012 are located on upper and lower sides of the first camera 3021, respectively.

Figure 10:
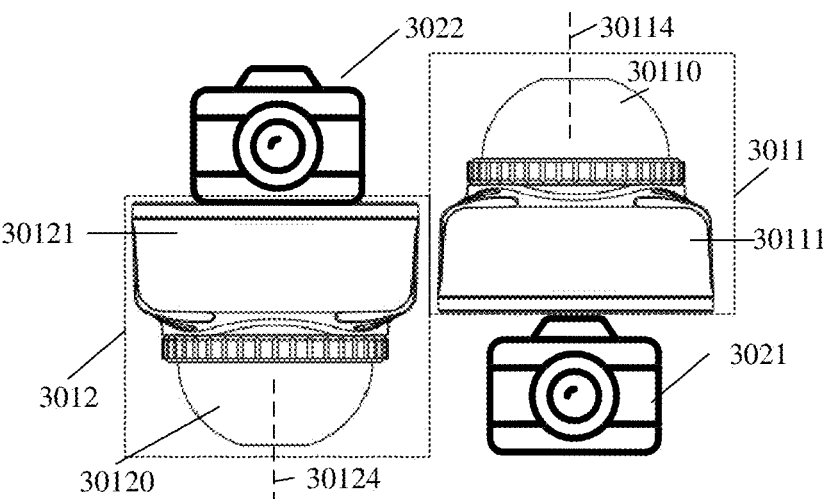
FIG. 10 is a schematic structural diagram of a sensor assembly according to an embodiment of the present disclosure.

FIG. 10 shows a sensor assembly 30 that includes a first lidar 3011, a second lidar 3012, a first camera 3021, and a second camera 3022, in which the first lidar 3011 and the second lidar 3012 are arranged along a preset first oblique diagonal line, and the first camera 3021 and the second camera 3022 are distributed along a preset second oblique diagonal line. The first oblique diagonal line and the second oblique diagonal line are disposed to cross each other. A base 30111 of the first lidar 3011 and a base 30121 of the second lidar 3012 may be basically held at a same height on the horizontal plane, and a height difference between an emitter point of a laser emitter 30110 of the first lidar 3011 and an emitter point of a laser emitter 30120 of the second lidar 3012 is about 7 cm.

Figure 11:
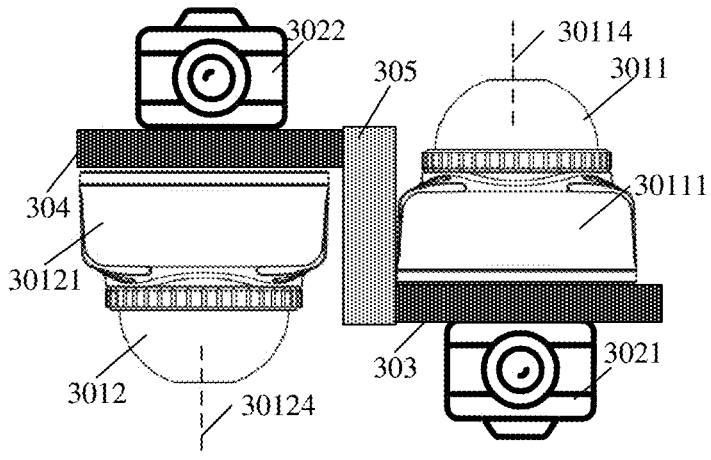
FIG. 11 is a schematic structural diagram of a sensor assembly according to an embodiment of the present disclosure.

Furthermore, as shown in FIG. 11, to realize optimal layout and stable installation of the sensor assembly 30, in an embodiment of the present disclosure, the sensor assembly 30 also includes a first installation platform 303 and a second installation platform 304 that are disposed adjacent to each other, and the first installation platform 303 is located below the second installation platform 304.

The first lidar 3011 is disposed on an upper surface of the first installation platform 303. Specifically, the base 30111 of the first lidar 3011 is disposed on the upper surface of the first installation platform 303.

The first camera 3021 is disposed on a lower surface of the first installation platform 303.

The second lidar 3012 is disposed on a lower surface of the second installation platform 304. Specifically, the base 30121 of the second lidar 3012 is disposed on the lower surface of the first installation platform 303.

The second camera 3022 is disposed on an upper surface of the second installation platform 304.

The sensor assembly 30 also includes a connection member 305, and the first installation platform 303 is connected to the second installation platform 304 through the connection member 305. Specifically, the first installation platform 303 and the second installation platform 304 are connected to two ends of the connection member 305, respectively. The first installation platform 303 and the second installation platform 304 are disposed in parallel with each other, and both the first installation platform 303 and the second installation platform 304 are perpendicularly connected to the connection member 305. In addition, the first installation platform 303, the second installation platform 304, and the connection part 305 may be integrally formed.

The above-mentioned examples are merely a portion of many possible configurations. In the embodiment of the present disclosure, a quantity of the lidar and camera is not limited, it is feasible to freely select and combine them according to an actual application requirement and a scenario. In addition, a layout of the sensor assembly 30 shown in FIG. 6a to FIG. 10 merely shows the quantity and the location of the lidars and cameras, orientations of the lidars and the cameras are not limited, as long as a vertical field of view of the lidar assembly 301 and a horizontal field of view of the camera assembly 302 are capable of covering the first target region A1 of the first stacking object A and the second target region B1 of the second stacking object B simultaneously.

Optionally, the lidar involved in the lidar assembly 301 in the embodiment of the present disclosure may be, but is not limited to, a 3D lidar.

As an implementable manner, sensor assemblies 30 shown in FIG. 10 and FIG. 11 are described in detail below.

In order to further optimize the detection capability of the lidar assembly 301 in a perpendicular direction, in an embodiment of the present disclosure, a center line 30114 of a laser emitter 30110 of the first lidar 3011 may be configured to be inclined downwards by in a first angle with respect to a horizontal plane, and a center line 30124 of a laser transmitter 30120 of the second lidar 3012 is configured to be inclined upwards by a second angle with respect to the horizontal plane. This arrangement manner may increase a field of view of the lidar assembly 301 in a vertical direction.

Among them, the center line of the laser emitter generally refers to a center axis of a laser beam, that is, a geometric center line of the laser beam emitted by the laser emitter.

Optionally, the first angle may be set to be an angle ranging from 0 degrees to 20 degrees, and the second angle may be set to be an angle ranging from 0 degrees to 20 degrees. The first angle and the second angle may be adaptively set according to a requirement of an actual application scenario.

FIG. 12 is a schematic diagram of a perpendicular field of view of a first lidar 3011 and a second lidar 3012 of a lidar assembly 301 according to an embodiment of the present disclosure. In FIG. 12, the vertical fields of view of the first lidar 3011 and the second lidar 3012 are both 59 degrees. A pitch angle of a center line 30114 of a laser emitter 30110 of the first lidar 3011 is set to be −10 degrees, that is, the center line 30114 of the laser emitter 30110 of the first lidar 3011 inclines downward by 10 degrees with respect to the horizontal plane. A pitch angle of a center line 30124 of a laser emitter 30120 of the second lidar 3012 is set to be +10 degrees, that is, the center line 30124 of the laser emitter 30120 of the second lidar 3012 inclines upwards by 10 degrees with respect to the horizontal plane. In this way, on the one hand, blind zones of the field of view of the first lidar 3011 and the second lidar 3012 in the vertical direction may be reduced, and on the other hand, a first overlapping region R1 of the first lidar 3011 and the second lidar 3012 in the vertical direction, that is, an area covered by diagonal lines in FIG. 12, may be formed, to make the lidar assembly 301 have double the point cloud density when collecting the point cloud data of the first target region and of the second target region, which is helpful to reduce an integration time, and thus the detection accuracy and the efficiency are improved.

Figure 13:
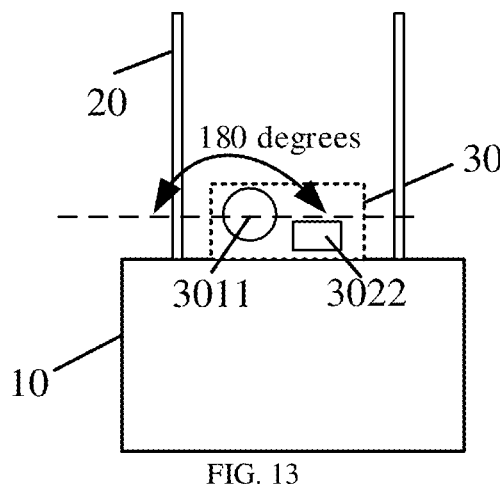
FIG. 13 is a schematic diagram of a positional relationship between a lidar assembly and a camera assembly according to the embodiment of the present disclosure.

Furthermore, FIG. 13 is a schematic diagram of a position relationship between a lidar assembly and a camera assembly according to an embodiment of the present disclosure. In FIG. 13, viewed from top to bottom, a first lidar 3011 and a second camera 3022 in the sensor assembly 30 may be seen. The second camera 3022 is relatively closer to the vehicle body 10 in a horizontal direction than a laser emitter 30110 of the first lidar 3011, to make a horizontal field of view of the first lidar 3011 be at least 180 degrees. Similarly, a first camera 3021 is relatively closer to the vehicle body 10 in the horizontal direction than a laser emitter 30110 of a second lidar 3012, to make a horizontal field of view of the second lidar 3012 be at least 180 degrees. Since the first camera 3021 and the second lidar 3012 are respectively shielded by the first lidar 3011 and the second camera 3022 in FIG. 13, they are not shown in FIG. 13.

In the embodiment of the present disclosure, by arranging the first camera 3021 and the second camera 3022 to be closer to the vehicle body 10, it is possible to effectively prevent the first camera 3021 and the second camera 3022 from shielding the horizontal fields of view of the second lidar 3012 and the first lidar 3011, and thus it is ensured that the second lidar 3012 and the first lidar 3011 are capable of capturing the point cloud data of the surrounding environment without hindrance. This layout strategy may improve coverage of the overall field of view of the sensor assembly 30, so that more comprehensive environment information is provided for the material handling equipment, and thus the security and efficiency of the material handling operation is improved.

Furthermore, a first included angle is formed between a center line of the first camera 3021 and the horizontal plane, and a second included angle is formed between a center line of the second camera 3022 and the horizontal plane, to make a combined horizontal field of view of the first camera 3021 and the second camera 3022 be at least 180 degrees.

Optionally, the first included angle may be set as an angle ranging from 40 degrees to 60 degrees, and the second included angle may be set as an angle ranging from 40 degrees and 60 degrees. The first included angle and the second included angle may be set adaptively according to a requirement of an actual application scenario.

Among them, a horizontal field of view of at least 180 degrees may ensure that more environment information is captured in a single scan, so that a requirement for performing multiple scans on the environment is reduced, and thus an efficiency of data acquisition is improved.

As shown in FIG. 14, in a practical application, the first camera 3021 and the second camera 3022 with a horizontal field of view of 100 degrees may be used, and a lens spacing between the first camera 3021 and the second camera 3022 ranges from 10 cm to 16 cm. In this case, an angle of a center line of the first camera 3021 from the horizontal line may be set to be half of the horizontal field of view of the first camera 3021, that is, 50 degrees. An angle of a center line of the second camera 3022 from the horizontal line is also set to be 50 degrees, and the horizontal fields of view of the first camera 3021 and the second camera 3022 together form a 180 degrees coverage. In FIG. 14, an area covered by diagonal lines indicates a second overlapping area R2 of the first camera 3021 and the second camera 3022 in the horizontal direction.

In addition, to ensure convenience of cabling and maintenance, in an embodiment of the present disclosure, a cabling manner of the first lidar 3011 and the second lidar 3012 may be a rear outgoing line manner or a side outgoing line manner.

The rear outgoing line manner refers to that cables of a lidar are led out from the rear of the lidar. In this manner, the cables may be arranged along a rear side of the lidar, which is helpful for maintaining the neatness of the front of the lidar, and at the same time, it is convenient to centrally lead the cables to the control assembly 40 or a power supply.

The side outgoing line manner refers to that cables of a lidar are led out from lateral sides of the lidar. In this manner, the cables may be arranged along a side of the lidar, which is helpful for cabling in an environment with limited space, and at the same time, the interference of the cables to a working area of the lidar is reduced.

For example, the lidar located on the left uses a left outgoing line manner, that is, the cables are led out from the left side of the lidar. The lidar located on the right side uses a right outgoing line manner, that is, the cables are led out from the right side of the lidar. This symmetrical layout is not only more beautiful visually, but also convenient for cabling and maintenance in a practical operation.

In addition, to improve flexibility of the material handling equipment and a space utilization, optionally, referring to FIG. 15, the vehicle body 10 may include a main body 101 and a movable part 102. The movable part 102 is moveably disposed on the vehicle body 101, the attachment assembly 20 is disposed on the movable part 102, and the movable part 102 is configured to drive the attachment assembly 20 to move relative to the vehicle body 101, for example, a lifting motion.

Based on this, the sensor assembly 30 may be disposed on the movable part 102, and is located below the attachment assembly 20 in the vertical direction.

In a practical application scenario, due to the limited installation space, the sensor assembly 30 is mounted within a compact space, this space is at least 10 cm away from a bottom of the attachment assembly 20 in a Z-axis direction of a coordinate system with the material handling equipment as the origin point, and is at least 10 cm away from two sides of the attachment assembly 20 in the Y-axis direction. This compact layout enables the material handling equipment to realize efficient integration of the sensor assembly 30 in a limited space while maintaining the flexibility of operation and the compactness of the material handling equipment.

It should be noted that, in a coordinate system with the material handling equipment as the origin point, in the embodiment of the present disclosure, a length direction of the material handling equipment is the X-axis, a width direction of the material handling equipment is the Y-axis, and a height direction of the material handling equipment is the Z-axis.

Based on the same concept, the embodiment of the present disclosure also provides a handling method applied to material handling equipment. As shown in FIG. 16, the material handling equipment includes a vehicle body 10, an attachment assembly 20, a sensor assembly 30, and a control assembly 40. The attachment assembly 20 is moveably disposed on the vehicle body 10, and is configured to pick and place a first stacking object A. The sensor assembly is disposed on the vehicle body 10, this method includes the following steps.

Step S1510: instructing, by control assembly 40, in a process of controlling the material handling equipment to handle the first stacking object A to make the first stacking object A be aligned with a second stacking object B, the sensor assembly 30 simultaneously acquires first target data and second target data. The first target data are data acquired by the sensor assembly 30 from a first target area A1 of the first stacking object A, and the second target data are data acquired by the sensor assembly 30 from a second target region B1 of the second stacking object B. Among them, a field of view of the sensor assembly 30 is capable of simultaneously covering the first target region A1 of the first stacking object A and the second target region B1 of the second stacking object B.

Step 1520: controlling, by the control assembly 40, at least one of the vehicle body 10 and the attachment assembly 20 to move, to correct a pose error of at least one of the vehicle body 10 and the attachment assembly 20 to make the first stacking object Abe aligned with the second stacking object B.

Referring to FIG. 17 and FIG. 20, furthermore, after aligning the first stacking object A with the second stacking B object, the handling method also includes step S1530:

controlling, by the control assembly 40, the attachment assembly 20 to move to make the attachment assembly 20 stack the first stacking object A on the second stacking object B.

Referring to FIG. 18 and FIG. 20, optionally, before the controlling, by the control assembly 40, the material handling equipment to handle the first stacking object A, the handling method may also include step S1509:

after controlling, by the control assembly 40, the material handling equipment to move to the front of the first stacking object A, instructing, the sensor assembly 30 to acquire third target data corresponding to a third target region A2 of the first stacking object A; in which the field of view of the sensor assembly 30 is capable of covering the third target region A2 of the first stacking object A; and controlling, by the control assembly 40, at least one of the vehicle body 10 and the attachment assembly 20 to move according to the third target data, to correct the pose error of at least one of the vehicle body 10 and the attachment assembly 20 to make the attachment assembly 20 implement picking up and placing of the first stacking object A.

In the embodiment of the present disclosure, the material handling equipment may simultaneously detect, pick and place the first stacking object A in a moving process. Such continuous operation process may effectively improve the efficiency of picking up and placing, so that the operation time is reduced, and thus the working efficiency of the material handling equipment is improved.

Referring to FIG. 19 and FIG. 20, furthermore, after the controlling, by the control assembly 40, the attachment assembly 20 to move, to make the attachment assembly 20 stack the first stacking object A on the second stacking object B, the handling method may also include step S1540:

controlling, by the control assembly 40, the attachment assembly 20 to perform an operation of releasing the first stacking object A.

Optionally, the sensor assembly 30 includes at least one of a lidar assembly 301 and a camera assembly 302.

The first target data includes at least one of first point cloud data collected by the lidar assembly 301 and first image data collected by the camera assembly 302.

The second target data include at least one of second point cloud data collected by the lidar assembly 301 and second image data collected by the camera assembly 302.

It should be noted that, specific principles and settings of the sensor assembly 30, the lidar assembly 301, the camera assembly 302, the material handling equipment, and the like, please refer to relevant records and the drawings in the foregoing embodiments, which are not described in details herein.

In the above-mentioned handling method, by simultaneously collecting the first target data of the first stacking object A and the second target of the second stacking object B, and controlling the material handling equipment based on these data, an accurate handling operation is realized, and thus the efficiency and the accuracy of the handling are improved.

Figure 21:
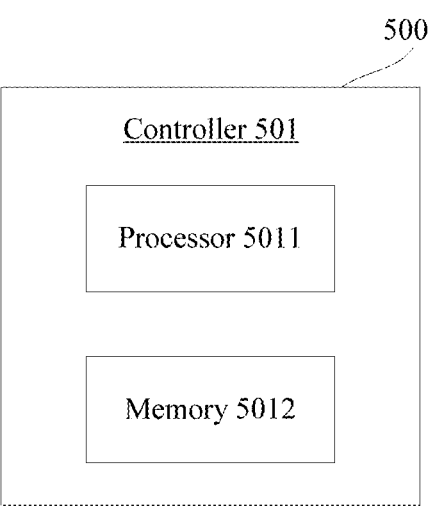
FIG. 21 is a structural block diagram of A control assembly according to an embodiment of the present disclosure.

Based on the same concept, referring to FIG. 21, an embodiment of the present disclosure also provides a control assembly 500. This control assembly 500 may include a controller 501. This controller 501 may be configured to execute the above-mentioned handling method. The controller 501 may be a system or device that performs a calculation or control function, such as a control motherboard, a control box, a control unit, a vehicle-mounted computer, a computing platform, a tablet computer, a computer, or a system or device that performs a calculation or control function in a local server or a cloud server, or it may be a handheld controller, a remote controller, or the like. This is not limited in the embodiment of the present disclosure herein. For example, the controller 501 may include a processor 5011 and a memory 5012.

The above-mentioned contents describe the specific embodiment of the present specification. Other embodiments are within the scope of the appended claims. In some cases, the actions or steps described in the claims may be executed in a sequence different from that in the embodiment, and the expected results may still be realized. In addition, the process depicted in the accompanying drawings does not necessarily require the shown specific sequence or continuous sequence to achieve the desired result. In some implementations, multi-task processing and parallel processing are also possible or may be advantageous.

The technical solutions provided in the present disclosure is described in detail above. In the specification, the principle and implementation of the present disclosure are described by using specific examples. The above embodiments are merely used to help understand the device, method and the core idea of the present disclosure. At the same time, for a person of ordinary skill in the art, there will be changes in the specific implementation and the application scope according to the idea of the present disclosure. In summary, the contents of the present specification should not be construed as a limitation on the present disclosure.

What is claimed is:

1. A material handling equipment, comprising:

a vehicle body;

an attachment assembly movably disposed on the vehicle body, and configured to pick and place a first stacking object;

a sensor assembly disposed on the vehicle body, wherein during a process in which the material handling equipment handles the first stacking object to make the first stacking object be aligned with a second stacking object, a field of view of the sensor assembly is capable of simultaneously covering a first target region of the first stacking object and a second target region of the second stacking object, to simultaneously acquire first target data corresponding to the first target region and second target data corresponding to the second target region; and a control assembly controlling at least one of the vehicle body and the attachment assembly to move according to the first target data and the second target data, to correct a pose error of at least one of the vehicle body and the attachment assembly to make the first stacking object be aligned with the second stacking object; wherein the sensor assembly comprises at least one of a lidar assembly and a camera assembly, the lidar assembly comprises at least two lidars, there is a first overlapping region in perpendicular fields of view of the at least two lidars, and the first overlapping area is capable of covering the first target region of the first stacking object and the second target region of the second stacking object simultaneously; and the camera assembly comprises at least two cameras, there is a second overlapping region in horizontal fields of view of the at least two cameras, and the second overlapping region is capable of covering the first target region of the first stacking object and the second target region of the second stacking object simultaneously, in a servo closed-loop alignment process, the control assembly controls the material handling equipment to continuously correct the pose error of at least one of the vehicle body and the attachment assembly according to an information fed back by the sensor assembly.

2. The material handling equipment according to claim 1, wherein the sensor assembly comprises the lidar assembly, the first target data comprise first point cloud data, and the second target data comprise second point could data; and a perpendicular field of view of the lidar assembly is capable of simultaneously covering the first target region of the first stacking object and the second target region of the second stacking object, to simultaneously acquire the first point cloud data corresponding to the first target region and the second point cloud corresponding to the second target region.

3. The material handling equipment according to claim 1, wherein the lidar assembly comprises a first lidar and a second lidar, and the first lidar and the second lidar are arranged in an upper and lower configuration.

4. The material handling equipment according to claim 3, wherein the first lidar and the second lidar respectively comprise a base and a laser emitter disposed on the base, the base and the laser emitter are vertically arranged, a side of the base away from the laser emitter has a first face, and the first face of the laser emitter of the first lidar is disposed to face towards or back to the first side of the laser emitter of the second lidar.

5. The material handling equipment according to claim 1, wherein the sensor assembly comprises the camera assembly, the first target data comprise first image data, and the second target data comprise second image data; and a horizontal field of view of the camera assembly is capable of covering the first target region of the first stacking object and the second target region of the second stacking object simultaneously, to simultaneously acquire the first image data corresponding to the first target region and the second image data corresponding to the second target region.

6. The material handling equipment according to claim 1, wherein the sensor assembly comprises the lidar assembly and the camera assembly; and the first target data comprise first point cloud data and first image data, and the second target data comprise second point cloud data and second image data;

a vertical field of view of the lidar assembly is capable of covering the first target region of the first stacking object and the second target region of the second stacking object simultaneously, to simultaneously acquire the first point could data corresponding to the first target region and the second point cloud data corresponding to the second target region; and a horizontal field of view of the camera assembly is capable of covering the first target region of the first stacking object and the second target region of the second stacking object simultaneously, to simultaneously acquire the first image data corresponding to the first target region and the second image data corresponding to the second target region.

7. The material handling equipment according to claim 6, wherein the at least two lidars are arranged in an oblique or a vertical direction.

8. The material handling equipment according to claim 6, wherein the at least two cameras are arranged in an oblique or a vertical direction.

9. The material handling equipment according to claim 6, wherein the lidar assembly comprises two lidars, and the camera assembly comprises two cameras, the two lidars are arranged along a preset oblique diagonal line, and the two cameras are distributed along a preset oblique diagonal line.

10. The material handling equipment according to claim 9, wherein the two lidars and the two cameras are respectively arranged along two different intersecting oblique diagonal lines, the two lidars comprise a first lidar and a second lidar, and the two cameras comprise a first camera and a second camera.

11. The material handling equipment according to claim 10, wherein a center line of a laser emitter of the first lidar is configured to be inclined downwards by a preset first angle with respect to a horizontal plane; and a center line of a laser transmitter of the second lidar is configured to be inclined upwards by a preset second angle with respect to the horizontal plane.

12. The material handling equipment according to claim 10, wherein the first camera is relatively closer to the vehicle body in a horizontal direction than a laser emitter of the second lidar, to make a horizontal field of view of the second lidar be at least 180 degrees; and the second camera is relatively closer to the vehicle body in the horizontal direction than a laser emitter of the first lidar, to make the horizontal field of view of the first lidar be at least 180 degrees.

13. The material handling equipment according to claim 10, wherein a center line of the first camera forms a first included angle with a horizontal plane, and a center line of the second camera forms a second included angle with the horizontal plane, to make a combined horizontal field of view of the first camera and the second camera be at least 180 degrees.

14. The material handling equipment according to claim 10, wherein the sensor assembly further comprises a first installation platform and a second installation platform disposed adjacent to each other, and the first installation platform is located below the second installation platform, wherein, the first lidar is disposed on an upper surface of the first installation platform;

the first camera is disposed on a lower surface of the first installation platform;

the second lidar is disposed on a lower surface of the second installation platform; and the second camera is disposed on an upper surface of the second installation platform.

15. The material handling equipment according to claim 1, wherein the vehicle body comprises a main body and a movable part, the movable part is disposed on the main body, the attachment assembly is disposed on the movable part, and the moving part is configured to drive the attachment assembly to move relative to the main body; and the sensor assembly is disposed on the movable part, and is located below the attachment assembly in a vertical direction.

16. A handling method applied to a material handling equipment, wherein the material handling equipment comprises a vehicle body, an attachment assembly, a sensor assembly and a control assembly, the attachment assembly is moveably disposed on the vehicle body, and the attachment assembly is configured to pick and place a first stacking object, and the sensor assembly is disposed on the vehicle body; and the handling method comprises:

instructing, by the control assembly, in a process of controlling the material handling equipment to handle the first stacking object to make the first stacking object be aligned with a second stacking object, the sensor assembly to simultaneously acquire first target data and second target data; the first target data being data acquired by the sensor assembly from a first target area of the first stacking object; and the second target data being data acquired by the sensor assembly from a second target region of the second stacking object; in which a field of view of the sensor assembly is capable of simultaneously covering the first target region of the first stacking object and the second target region of the second stacking object; and controlling, by the control assembly, according to the first target data and the second target data, at least one of the vehicle body and the attachment assembly to move, to correct a pose error of at least one of the vehicle body and the attachment assembly to make the first stacking object be aligned with the second stacking object; wherein the sensor assembly comprises at least one of a lidar assembly and a camera assembly, the lidar assembly comprises at least two lidars, there is a first overlapping region in perpendicular fields of view of the at least two lidars, and the first overlapping area is capable of covering the first target region of the first stacking object and the second target region of the second stacking object simultaneously; and the camera assembly comprises at least two cameras, there is a second overlapping region in horizontal fields of view of the at least two cameras, and the second overlapping region is capable of covering the first target region of the first stacking object and the second target region of the second stacking object simultaneously, in a servo closed-loop alignment process, the control assembly controls the material handling equipment to continuously correct the pose error of at least one of the vehicle body and the attachment assembly according to an information fed back by the sensor assembly.

17. The handling method according to claim 16, wherein after aligning the first stacking object with the second stacking object, the handling method further comprises:

controlling, by the control assembly, the attachment assembly to move to make the attachment assembly stack the first stacking object on the second stacking object.

18. The handling method according to claim 16, wherein before the controlling, by the control assembly, the material handling equipment to handle the first stacking object, the handling method further comprises:

after controlling, by the control assembly, the material handling equipment to move to the front of the first stacking object, instructing the sensor assembly to acquire third target data corresponding to a third target region of the first stacking object, wherein the field of view of the sensor assembly is capable of covering the third target region of the first stacking object; and controlling, by the control assembly, at least one of the vehicle body and the attachment assembly to move according to the third target data, to correct the pose error of at least one of the vehicle body and the attachment assembly to make the attachment assembly implement pick and place of the first stacking object.

19. The handling method according to claim 16, wherein after the controlling, by the control assembly, the attachment assembly to move to make the attachment assembly stack the first stacking object on the second stacking object, the handling method further comprises:

controlling, by the control assembly, the attachment assembly to perform an operation of releasing the first stacking object.

20. The handling method according to claim 16, wherein the sensor assembly comprises at least one of a lidar assembly and a camera assembly;

the first target data comprise at least one of first point cloud data collected by the lidar assembly and first image data collected by the camera assembly; and the second target data comprise at least one of second point cloud data collected by the lidar assembly and second image data collected by the camera assembly.

21. A control assembly, comprising a controller configured to execute the handling method according to claim 16.

\* \* \* \* \*